May 16, 1933.  E. R. SEWARD  1,909,019
PIPE SHAPING MACHINE
Filed March 20, 1931   3 Sheets-Sheet 1
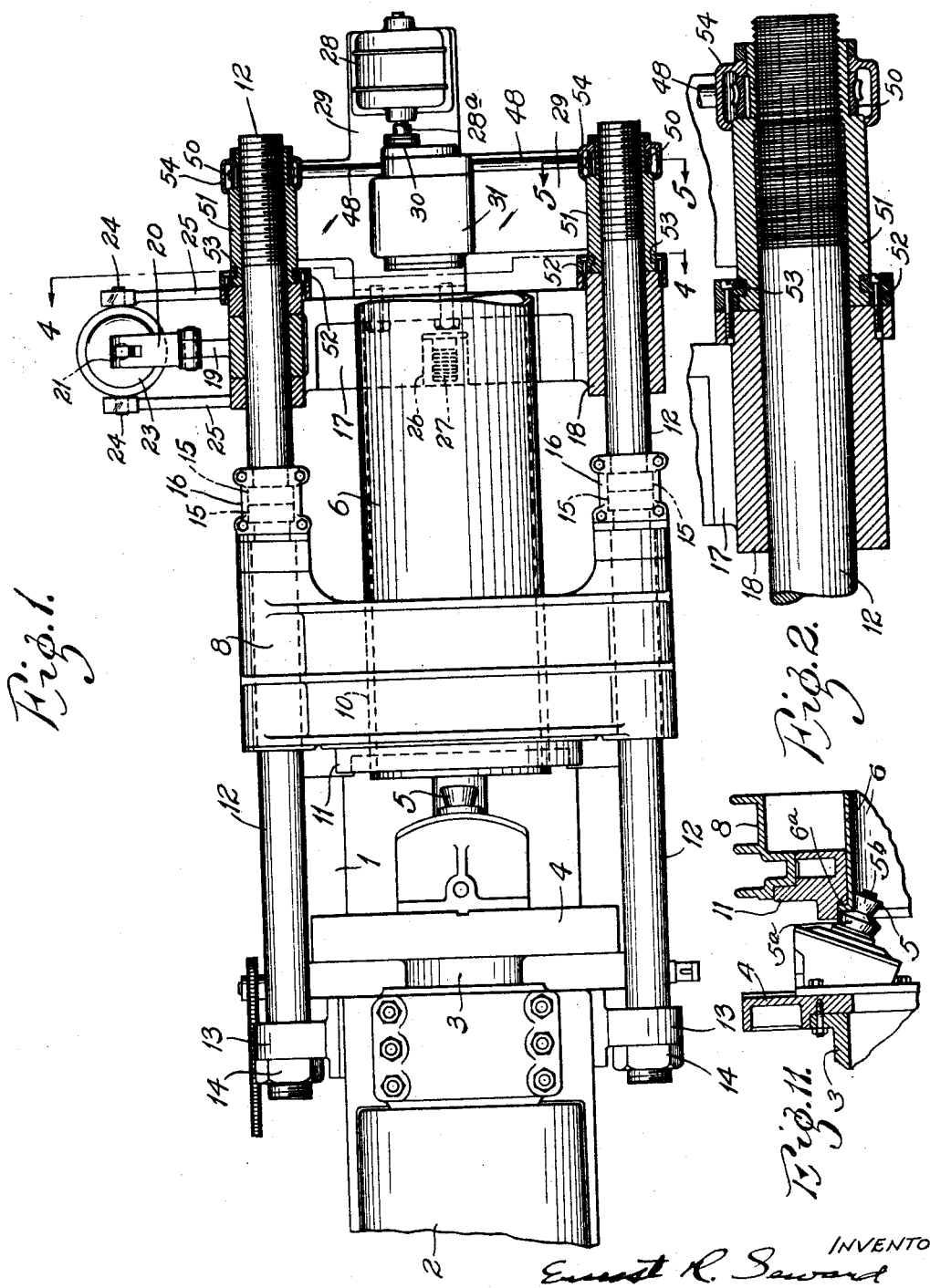

May 16, 1933.   E. R. SEWARD   1,909,019
PIPE SHAPING MACHINE
Filed March 20, 1931   3 Sheets-Sheet 2

INVENTOR:
Ernest R. Seward
by Carrett Carrett Gravely
HIS ATTORNEYS.

May 16, 1933.  E. R. SEWARD  1,909,019
PIPE SHAPING MACHINE
Filed March 20, 1931  3 Sheets-Sheet 3
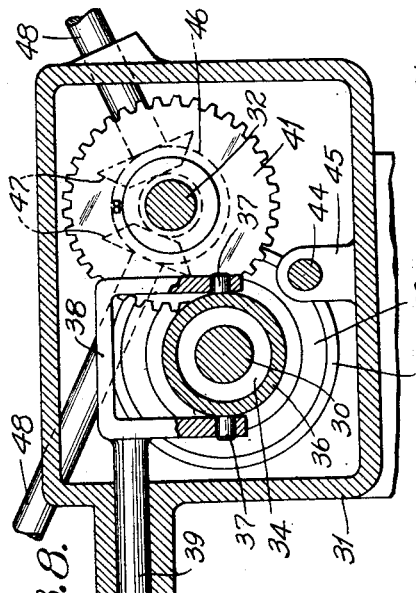
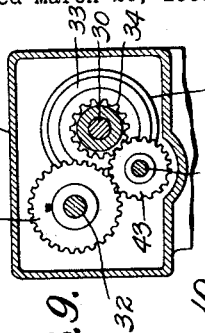
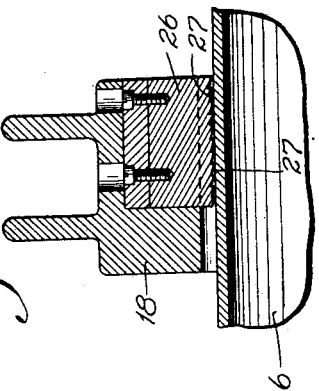
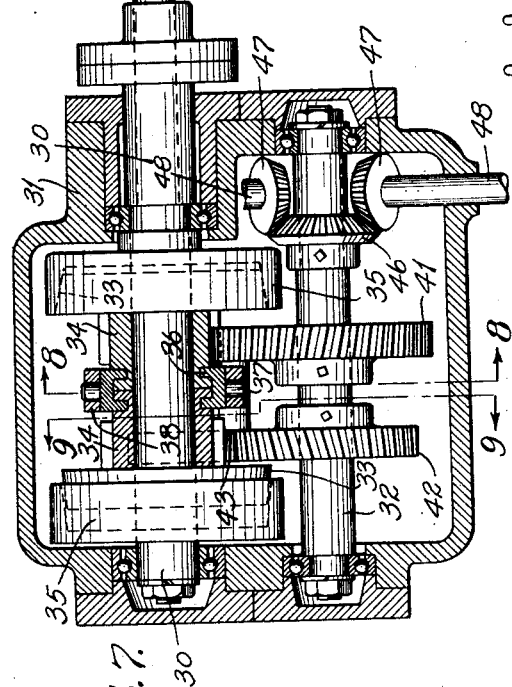
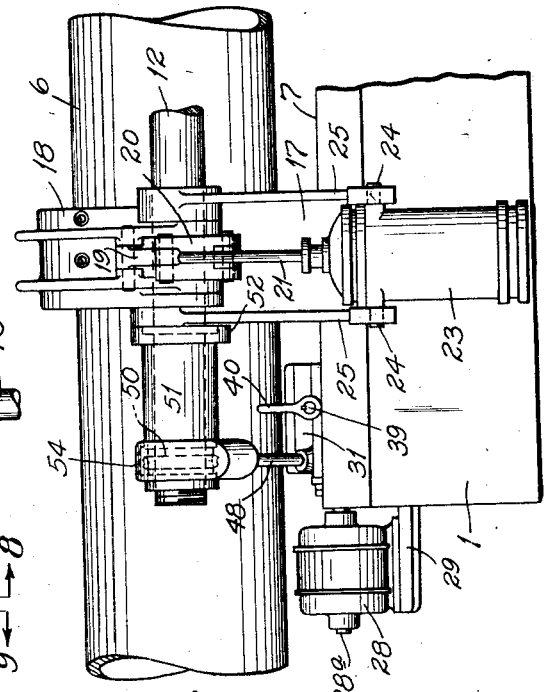
INVENTOR:
Ernest R. Seward
by Carnot Carnot Gravely
HIS ATTORNEYS.

Patented May 16, 1933

1,909,019

UNITED STATES PATENT OFFICE

ERNEST R. SEWARD, OF KIRKWOOD, MISSOURI, ASSIGNOR TO LEHMANN MACHINE COMPANY, OF ST. LOUIS, MISSOURI, A CORPORATION OF MISSOURI

PIPE SHAPING MACHINE

Application filed March 20, 1931. Serial No. 523,977.

This invention relates to machines for flanging or otherwise shaping the ends of metal pipes by means of rotatable rollers. The principal object of the present invention is to provide a power-operated mechanism for quickly and accurately positioning and feeding the pipe relative to the shaping rollers and to the die and for receiving the thrust of said rollers. Other objects are simplicity and cheapness of construction, fewness of parts and compactness of design. The invention consists in the pipe-shaping machine and in the construction, combination and arrangements of parts hereinafter described and claimed.

In the accompanying drawings, which form part of this specification and wherein like symbols refer to like parts wherever they occur, Fig. 1 is a plan view of a portion of a pipe-shaping machine provided with a pipe positioning and feeding mechanism embodying my invention;

Fig. 2 is an enlarged fragmentary longitudinal cross-section showing the manner of supporting the pipe clamp upon the tension rods and the connection between the feed nut and said clamp;

Fig. 6 is a side elevation of the rear end portion of the machine;

Fig. 7 is a horizontal cross-section through the housing containing the gearing for operating the pipe positioning and feeding mechanism;

Fig. 8 is a vertical cross-section on the line 8—8 in Fig. 7;

Fig. 9 is a similar cross-section on the line 9—9 in Fig. 7;

Fig. 10 is a cross-section on the line 10—10 in Fig. 4, showing one of the toothed blocks for gripping the pipe; and Fig. 11 is a fragmentary longitudinal section through the upper portion of the die-holding slide with the pipe therein and with a pipe-flanging roller shown in engagement with the end of the pipe to form the flange thereon.

Figure 3:
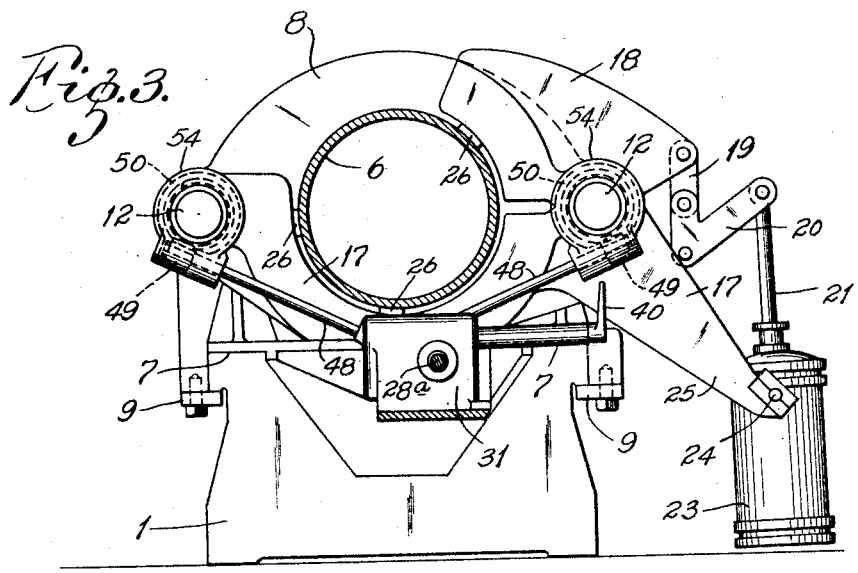
Fig. 3 is a rear end view of the machine.
Figure 4:
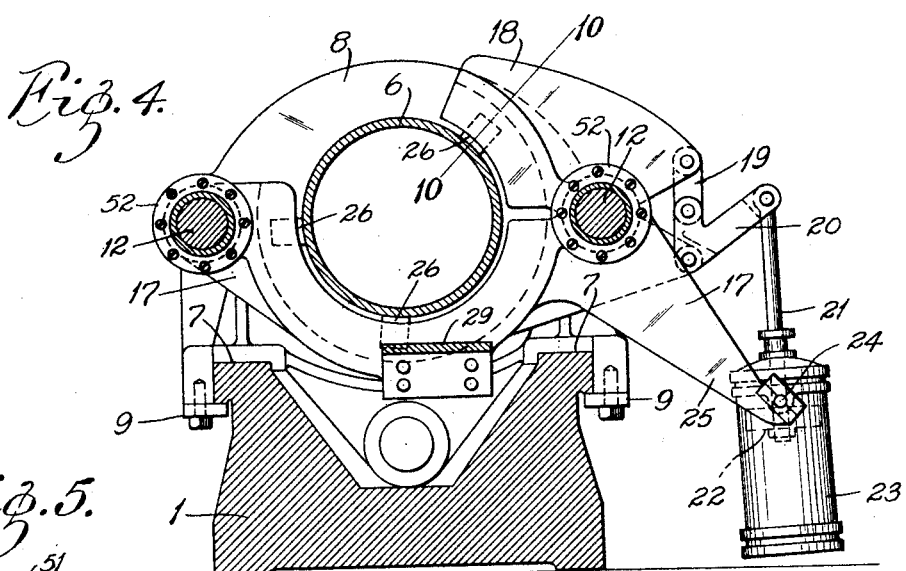
Fig. 4 is a vertical transverse cross-section on the line 4—4 in Fig. 1.
Figure 5:
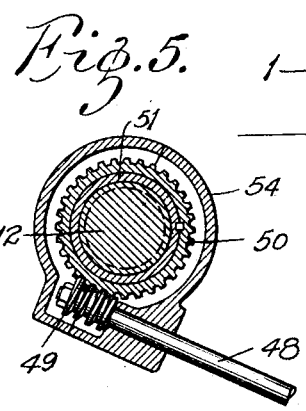
Fig. 5 is a cross-section on the line 5—5 in Fig. 1.

Referring to the accompanying drawings, my invention is shown in connection with a pipe-shaping machine comprising a bed 1 upon which is mounted a head-stock 2 having a horizontally disposed rotary and axially movable spindle 3 mounted therein which extends longitudinally of said bed. Secured to the outer end of the spindle 3 is a face plate 4, upon which is rotatably mounted a pipe-shaping member, preferably in the form of a combined flanging and upsetting roller 5, adapted to engage the heated end of a pipe 6 located adjacent thereto to form a flange 6a thereon. In accordance with common practice, the flange 6a is formed on the end of the pipe 6 by causing relative endwise movement of said pipe and the roller 5. As shown in Fig. 11, the end of the pipe is forced into a suitable die member 11 by the surface 5a of the roller 5, which revolves about the axis of the spindle 3 and has an end portion 5b adapted to engage the interior face of the pipe to prevent the metal from being forced inwardly.

Mounted on horizontal slideways 7, which extend longitudinally of the bed 1 provided on opposite sides thereof, is a die-holding slide 8. The die-holding slide 8 is held against movement along the slideways 7 preferably by means of clamping plates 9 that are bolted to the undersides of said die-holding slide and bear against the undersides of ledges that extend longitudinally of the bed 1 of the machine on opposite sides thereof. The die-holding slide 8 is provided opposite the face plate 4 of the head-stock 2 with a cylindrical opening 10 adapted to receive and support the forward end portion of the pipe 6 that is to be flanged; and the face plate opposing end of said opening is countersunk to provide a seat for the die member 11 which has a recess therein adapted to receive and shape the portion of the pipe that is forced therein by the flanging roller 5 carried by said face plate.

The die-holding slide 8 is further prevented from being moved along the slideways 7 by the thrust of the flanging roller 5 by means of parallel tension rods 12 that extend longitudinally of the machine on the opposite sides thereof. Each of these tension rods comprises a forward section which extends through an opening in a laterally extending lug 13 on the side of the headstock 2 and is threaded to receive a nut 14, which bears against the front face of said lug and thus prevents rearward sliding movement of said rod. The rear end portion of the forward section of each tension rod 12 extends through an opening provided therefor in the adjacent side of the die-holding slide 8 and terminates in an enlarged head or collar 15 disposed in abutting relation to a similar enlarged head or collar 15 on the adjacent forward end of the rear section of said tension rod. The adjacent ends of the forward and rear sections of each tension rod 12 are secured rigidly together and to the die-holding slide 8 by means of a clamping plate 16 that is bolted to said slide and snugly embraces the heads 15 on the adjacent ends of said sections.

The pipe 6 that is to be shaped is held against rearward sliding movement under pressure of the shaping roller 5 by means of a clamp comprising a main body or cradle portion 17 which spans from tension rod 12 to tension rod 12 and is provided with openings adapted to receive said rods, whereby said clamp member is supported on said rods for sliding movement longitudinally thereof. The clamp is provided with a hinged jaw member 18 rotatably mounted on one of the tension rods 12, which jaw member is swung towards the pipe 6 to firmly hold the latter within the clamp by means of a toggle lever comprising a link 19 pivotally secured at one end to said jaw member and at the other end to one arm of a bent lever 20, which is pivotally secured to the main body portion 17 of the pipe clamp. The other arm of the bent lever 20 is pivotally connected to the upper end of a rod 21, whose lower end is connected to a piston 22 working in a cylinder 23 that is provided with trunnions 24 journaled in bearings provided therefor in arms 25 carried by the lower or main member 17 of a pipe clamp. By this arrangement, when the piston is moved upwardly in the cylinder the toggle is actuated to swing the jaw member in a direction that will cause the clamp to grip the pipe, and when the piston is moved downwardly in the cylinder the toggle is broken and pressure of the clamp on the pipe is released. The main body portion 17 of the clamp, together with the hinged jaw member 18 thereof, is provided with removable blocks 26, whose pipe-engaging surfaces are formed with teeth 27 that bite into the pipe and thus prevent movement thereof relative to the clamp and to the die 11 carried by the die-holding slide 8.

The pipe clamp is slid longitudinally of the tension rods 12 to position and feed the pipe 6 relative to the die 11 and the flanging roller 5 by means of mechanism driven by an electric motor 28 supported on a cross-plate 29, which is bolted or otherwise rigidly secured to the main body portion 17 of the pipe clamp for movement therewith and has its ends slidably supported on the longitudinal slideways 7 on the bed of the machine. The armature shaft 28a of the motor 28 is coupled to a shaft 30 that extends through a gear casing or housing 31 with its end portions journaled in suitable bearings mounted in the opposite end walls of said housing. Mounted on the drive shaft 30 are two cone-clutches for transmitting power through gearings from said shaft to a driven shaft 32 disposed parallel thereto with its ends journaled in bearings mounted in the ends of the gear casing or housing 31. Each of said cone-clutches comprises a conical plug 33 keyed on a pinion 34, which is slidable and rotatable on the drive shaft 30, and a sleeve 35, which is keyed to said drive shaft and has a conical interior surface corresponding to that of said plug, whereby the clutch acts by frictional contact of these two conical surfaces when the pinion is slid on said drive shaft in the proper direction. The adjacent ends of the two pinions 34 are secured together by a suitable shifter ring 36, which is provided with oppositely disposed pins 37 that are engaged by the arms of the forked end 38 of a rock shaft 39 journaled in the adjacent side wall of the gear housing 31. The rock shaft 39 is provided at its outer end with an operating handle 40 that is readily accessible to the operator.

The driven shaft 32 has a gear 41 fixed thereto which permanently meshes with one of the sliding pinions 34 on the drive shaft 30. A second gear 42 is fixed to the driven shaft 32 and meshes permanently with an idler gear 43 fixed to a shaft 44 journaled in a suitable bearing 45 provided therefor in the bottom of the gear housing 31. The idler gear 43, in turn, meshes permanently with the other sliding pinion 34 on the driving shaft 30. By this arrangement, when the clutch shifter ring 36 is operated to force one of the clutch cones 33 into frictional engagement with the conical interior surface of the continuously rotating sleeve 35 located adjacent thereto, the pinion 34, to which said sleeve is secured, is forced to turn with the continuously rotating drive shaft 30 and thus transmits power to the driven shaft 32 through said pinion and the gear meshing therewith. Thus the driven shaft may be made to turn in either direction, depending upon which one of the cone-clutches is operated. The sliding pinion 34 on the drive shaft 30, together with the gears 41 and 42 on the driven shaft 32, and the idler gear 43, have spiral teeth, the obliquity of such teeth causing an end thrust in the direction of the cones 33 sufficient to keep them in engagement with conical sleeves 35 without requiring special holding devices for this purpose.

Fixed to the driven shaft 32 is a bevel gear 46, which drives two bevel gears 47 that are fixed to the ends of shafts 48 that extend upwardly on opposite sides of the gear box 31 with their upper or outer ends terminating beneath the rear end portions of the tension rods 12. Each of the shafts 48 is provided at its upper or outer end with a worm 49, which meshes with a worm gear 50 that is keyed to a nut 51 threaded on the rear end portion of the adjacent tension rod 12. Each nut 51 is rotatably secured to the main body member 17 of the pipe clamp by means of a ring 52, which is screwed to said clamp member and has an annular flange 53 that fits within an annular groove provided therefor in the adjacent end portion of said nut. By this arrangement the nuts 51 are permitted to rotate relative to the pipe clamp but cannot be slid along the tension rods independently of each other. The worm 49 and worm gear 50 are enclosed within an oil containing housing 54, which is sleeved on the nut 51.

By the arrangement described, the pipe 6 that is to be shaped is placed within the pipe clamp with its forward end supported in the die-holding slide 8. The pipe clamp is then closed upon the pipe by operating the piston 22. The pipe is then shifted in the direction of its length by operating the handle 40 of the clutch shifter rod 39, thereby transmitting the drive from the continuously rotating motor-driven drive shaft 30 to the driven shaft 32 and thence through the inclined shafts 48 to the nuts 51 which are rotated and thus move endwise of the tension rods 12 and carry the pipe clamp and the pipe therewith. The direction in which the clamp and pipe supported therein are moved depends upon which one of the cone-clutches is actuated when the handle 40 of the clutch shifter rod 39 is operated.

The hereinbefore described pipe positioning and feed mechanism has numerous advantages. It permits the pipe to be quickly and easily moved in the direction of its length to accurately position and feed the pipe with reference to the die and to the shaping roller. It provides a simple arrangement for supporting the work and for receiving the end thrust of the shaping roller; and it is simple, efficient, easy to operate and is not liable to get out of repair.

What I claim is:

1. A pipe-shaping machine comprising means for shaping the pipe, a pipe support movable relative to said shaping means, means for securing the pipe in said support, power-operated means for moving said pipe support, and control means for said power-operated means for controlling the length of movement of said pipe support.

2. A pipe shaping machine comprising means for shaping the pipe, a pipe support movable relative to said shaping means, means for securing the pipe in said support, and means for moving said pipe support, said means including a motor mounted on said pipe support for movement therewith.

3. A pipe-shaping machine comprising a die adapted to receive the pipe, a pipe clamp movable relative to said die for positioning the pipe therein, and power-operated means for moving said pipe clamp, said power-operated means including a motor mounted on said pipe clamp for movement therewith.

4. A pipe-shaping machine comprising means for shaping the pipe, horizontally disposed tension rods secured to said machine, a pipe support slidable upon said tension rods towards and away from said pipe-shaping means, means for securing the pipe in said pipe support, and power-operated means carried by said pipe support and operatively connected therewith for moving the same along said tension rods.

5. A pipe-shaping machine comprising means for shaping the pipe, parallel tension rods secured to said machine, a pipe support slidable upon said tension rods towards and away from said pipe shaping means, means for securing the pipe in said pipe support, power-operated means carried by said pipe support for moving the same along said tension rods, said means comprising a motor mounted on said pipe support, nuts threaded on said tension rods and rotatably secured to said pipe support, and mechanism operatively connecting said motor to said nuts for rotating the latter.

6. A pipe-shaping machine comprising means for shaping the pipe, horizontally disposed tension rods secured to said machine, a pipe clamp slidable upon said tension rods towards and away from said pipe shaping means, power-operated means carried by said pipe clamp for moving the same along said tension rods, said means comprising an electric motor mounted on said pipe clamp, nuts threaded on said tension rods and rotatably secured to said pipe clamp, and mechanism operatively connecting said motor to said nuts for rotating the latter in either direction.

7. A pipe-shaping machine comprising means for shaping the pipe, horizontally disposed tension rods secured to said machine, a pipe support slidable upon said tension rods towards and away from said pipe-shaping means, means for securing the pipe in said pipe support, power-operated means carried by said pipe support for moving the same along said tension rods, said means comprising a motor mounted on said pipe support, nuts threaded on said tension rods and rotatably secured to said pipe support, and mechanism operatively connecting said motor to said nuts for rotating the latter, said mechanism including clutch devices for rotating said nuts in either direction.

8. A pipe-shaping machine comprising means for shaping the pipe, horizontally disposed tension rods secured to said machine, a pipe support slidably mounted upon said tension rods for movement towards and away from said pipe-shaping means, means for securing the pipe in said pipe support, power-operated means carried by said pipe support for moving the same along said tension rods, said means comprising a motor, a driven shaft, gearing operatively connecting said motor to said driven shaft for rotating the latter in either direction, nuts threaded on said tension rods and rotatably connected to said pipe support, and connections between said driven shaft and said nuts for rotating the latter.

9. A pipe-shaping machine comprising means for shaping the pipe, horizontally disposed tension rods secured to said machine, a pipe support slidable upon said tension rods towards and away from said pipe-shaping means, means for securing the pipe in said pipe support, power-operated means carried by said pipe support for moving the same along said tension rods, said means comprising a motor, a driven shaft, reversing gearing operatively connecting said motor to said driven shaft for rotating the latter in either direction, nuts threaded on said tension rods and rotatably connected to said pipe support, and connections between said driven shaft and said nuts for simultaneously rotating the latter, said connections comprising a gear on said driven shaft, shafts located on opposite sides of said gear and provided with gears intermeshing therewith, worms on said last-mentioned shafts, and worm gears fixed to said nuts and intermeshing with said worms.

10. A pipe-shaping machine comprising means for shaping the pipe, horizontally disposed tension rods secured to said machine, a pipe clamp slidable upon said tension rods towards and away from said pipe-shaping means, and power-operated means movable with said pipe clamp for moving the same along said tension rods, said means comprising an electric motor, a driven shaft, reversing gearing operatively connecting said motor to said driven shaft for rotating the latter in either direction, nuts threaded on said tension rods and rotatably connected to said pipe clamp, connections between said driven shaft and said nuts for rotating the latter, said connections comprising a gear on said driven shaft, shafts located on opposite sides of said gear and provided with gears intermeshing therewith, worms on said shafts, worm gears fixed to said nuts and intermeshing with said worms, and lubricant containing housings mounted on said nuts and enclosing said worms and worm gears.

11. A pipe-shaping machine comprising means for shaping the pipe, a pipe clamp movable towards and away from said shaping means, power-operated means carried by said pipe clamp for moving said pipe clamp, and control means for said power operated clamp moving means for regulating the length of movement of said pipe clamp.

12. A pipe-shaping machine comprising means for shaping the pipe, horizontally disposed tension rods secured to said machine, a pipe clamp slidable upon said tension rods towards and away from said pipe-shaping means, and power-operated means carried by said pipe clamp and operatively connected therewith for moving the same along said tension rods.

13. A pipe-shaping machine comprising means for shaping the pipe, horizontally disposed tension rods secured to said machine, the pipe clamp slidable upon said tension rods towards and away from said pipe-shaping means, power-operated means carried by said pipe clamp for moving the same along said tension rods, said means comprising a motor mounted on said pipe clamp, nuts threaded on said tension rods and rotatably secured to said pipe clamp, and mechanism mounted on said clamp and operatively connecting said motor to said nuts for rotating the latter, said mechanism including clutch devices for rotating said nuts in either direction.

14. A pipe-shaping machine comprising means for shaping the pipe, horizontally disposed tension rods secured to said machine, a pipe clamp slidable upon said tension rods towards and away from said pipe-shaping means, power-operated means carried by said pipe clamp for moving the same along said tension rods, said means comprising a driven shaft, reversing gearing operatively connecting said motor to said driven shaft for rotating the latter in either direction, nuts threaded on said tension rods and rotatably connected to said pipe clamp, and connections between said driven shaft and said nuts for rotating the latter.

15. A pipe-shaping machine comprising means for shaping the pipe, horizontally disposed tension rods secured to said machine, a pipe clamp slidable upon said tension rods towards and away from said pipe-shaping means, fluid-pressure means movable with said pipe clamp for operating the same, and means mounted on and movable with said pipe clamp for moving the same along said tension rods.

16. A pipe-shaping machine comprising means for shaping the pipe, horizontally disposed tension rods secured to said machine, a pipe clamp slidable upon said tension rods towards and away from said pipe-shaping means, said pipe clamp having a hinged jaw member, a link connected at one end to said jaw member, a bent lever pivotally mounted on said clamp and pivotally connected to the other end of said link, and fluid-pressure means mounted on said clamp and operatively connected to said bent lever.

Signed at St. Louis, Missouri, this 16 day of March, 1931.

ERNEST R. SEWARD.